(12) United States Patent
Baba (10) Patent No.: US 6,597,735 B1
(45) Date of Patent: Jul. 22, 2003

(54) TIMER ASSEMBLY FOR GENERATING A PWM SIGNAL

(75) Inventor: Yasushi Baba, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/433,057

(22) Filed: Nov. 3, 1999

(30) Foreign Application Priority Data

Nov. 4, 1998 (JP) ............................................ 10-313749

(51) Int. Cl.[7] .............................. H03K 9/08; G06E 1/14
(52) U.S. Cl. ...................................... 375/238; 713/502
(58) Field of Search ......................... 322/108; 327/157, 327/175, 238, 178; 377/20, 107; 375/238; 395/550; 713/502

(56) References Cited

U.S. PATENT DOCUMENTS

| | | | |
|---|---|---|---|
| 5,323,438 A | * | 6/1994 | Kim ............................ 327/178 |
| 5,535,379 A | * | 7/1996 | Koura ......................... 377/107 |
| 5,647,387 A | * | 7/1997 | Tsutsui ........................... 137/1 |
| 5,812,834 A | * | 9/1998 | Suzuki ........................ 713/502 |
| 6,023,741 A | * | 2/2000 | Yoshino ...................... 327/175 |

FOREIGN PATENT DOCUMENTS

| | | |
|---|---|---|
| JP | 61-62592 | 4/1986 |
| JP | 61-251484 | 11/1986 |
| JP | 7-231688 | 8/1995 |

OTHER PUBLICATIONS

Japanese Office Action, dated Nov. 25, 1999, with English language translation of Japanese Examiner's comments.

* cited by examiner

Primary Examiner—Stephen Chin
Assistant Examiner—Lawrence Williams
(74) Attorney, Agent, or Firm—Whitham, Curtis & Christofferson, P.C.

(57) ABSTRACT

A small-scale timer assembly includes a PWM signal generator including a selector for selecting one of a plurality of clock sources, a timer for counting based on the selected clock source to deliver an overflow signal, a comparator for comparing the count in the timer against a setting to deliver a coincidence signal, and a signal processor for generating a PWM signal based on the overflow signal and the coincidence signal, and a count controller for counting the number of overflow signals to allow the selector to select another of the clock sources. The PWM signal is used for generating a sinusoidal signal.

9 Claims, 6 Drawing Sheets

TIMER ASSEMBLY FOR GENERATING A PWM SIGNAL

BACKGROUND OF THE INVENTION (a) Field of the Invention

The present invention relates to a timer assembly and, more particularly, to a timer assembly having a function for outputting a pulse-width-modulated (PWM) signal.

(b) Description of the Related Art

PWM signals are generally used in a technical field for driving a variety of motors, for generating sinusoidal signals having desired frequencies.

Patent Publication JP-A-61-251484 describes a conventional PWM control technique applied to an inverter implemented by digital circuit elements. Patent Publication JP-A-7-231688 describes a phase locked loop (PLL) circuit having a PWM signal generator for generating an output clock signal based on a reference clock signal by using synchronous processing and PWM processing.

Figure 1:
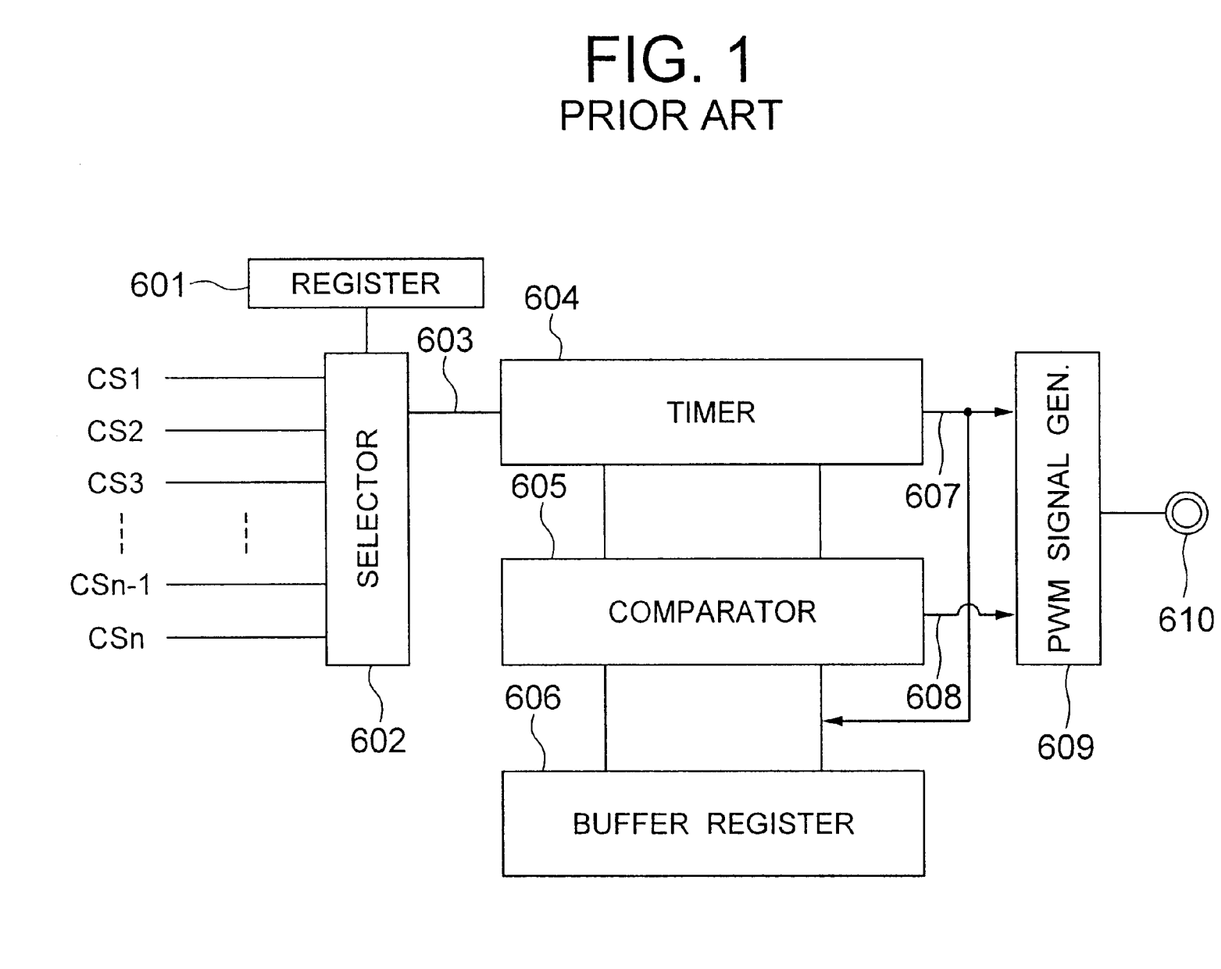
FIG. 1 is a block diagram to of a conventional timer assembly.

FIG. 1 shows a typical configuration of a timer assembly used for generating a PWM signal. The timer assembly includes a register 601, a selector 602, a timer 604, a comparator 605, a buffer register 606 and a signal processor 609.

The register 601 receives and stores a setting for resolution which defines the resolution of the timer assembly by specifying a desired clock signal. The selector 602 selects one of a plurality of clock sources CS1 to CSn based on the setting stored in the register 601 to provide a specific clock signal (count clock signal) 603 based on which the timer 604 is to count.

The timer 604 counts based on the clock signal 603 to deliver a count signal to the comparator 605, and also deliver an overflow signal 607 to the signal processor 609 and the buffer register 606 when the count of the timer 604 exceeds a timer setting therein.

The buffer register 606 receives and stores a duty setting, which specifies the duty of the PWM signal to be supplied from the signal processor 609 as an output from the timer assembly. The comparator 605 compares the count by the timer 604 against the duty setting supplied from the buffer register 606 to deliver a coincidence signal 608 to the signal processor 609 upon coincidence of the count of the timer 604 with the duty setting. The buffer register 606 delivers the duty setting to the comparator 605 in response to the overflow signal 607.

The signal processor 609 responds to the overflow signal 607 and the coincidence signal 608 to generate a PWM signal, and delivers the resultant PWM signal through an output terminal 610 to an external circuit, which generates a sinusoidal signal based on the PWM signal.

Figure 2A:
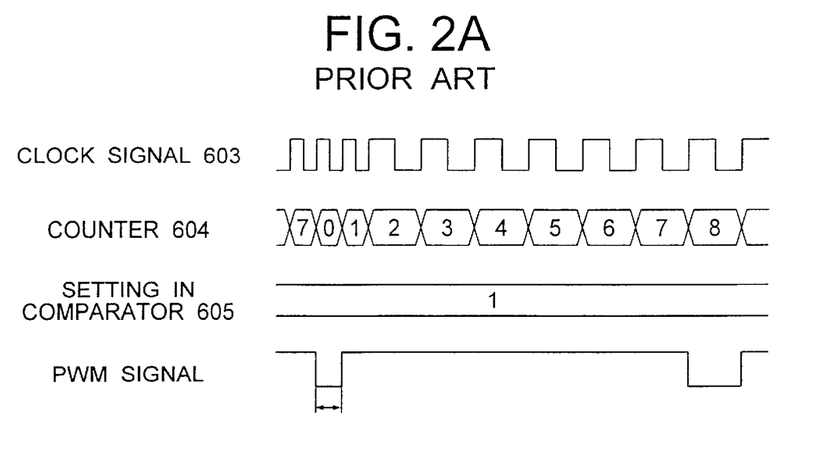
FIGS. 2A and 2B are timing charts of the timer assembly of FIG. 1 for showing timings of the changeover of the clock signals.
Figure 2B:
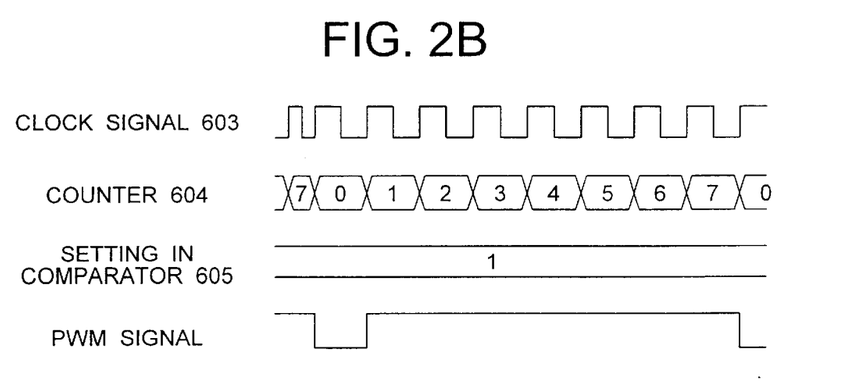

Figs, 2A and 2B show timing charts of the timer assembly shown in FIG. 1. In operation of the timer assembly, the timer 604 counts the clock signal 603 selected by the selector 602 based on the setting of the register 601. In the example of these drawings, it is shown that the timer setting is set at seven.

The count by the timer 604 based on the clock signal 603 starts from zero to the timer setting (seven), and returns to zero for next counting when the count exceeds the timer setting. The timer 604 iterates the counting between the zero count and the timer setting to specify the repetitive period (referred to as simply "period") of the output PWM signal, which is equal to the time interval between the zero count and the timer setting by the timer 604. The duty of the PWM signal is defined by the time interval between the time instant of the coincidence signal and the time instant of the overflow signal.

In the examples of both FIGS. 2A and 2B, the duty setting of the buffer register 606 is set at one, whereby the comparator 605 delivers a coincidence signal at the count "1" of the timer 604. The buffer register 606 updates the next duty setting each time the timer 604 delivers the overflow signal 608, and delivers the next setting to the comparator 605. The duty of the PWM signal is updated at a desired timing by an external device such as a microcomputer, which responds to the overflow signal as an interrupt signal.

As described above, in the timer assembly of FIG. 1, if a sinusoidal is to be generated sequence of PWM pulses, the microcomputer uses a data table for specifying the duty of each PWM pulse based on the instantaneous amplitude of the desired sinusoidal signal. If the frequency of the sinusoidal signal is to be changed, the microcomputer provides the duty setting of the buffer register 606 based on the data for the frequency of the sinusoidal signal among a variety of sinusoidal signals having respective frequencies. The data for the variety of sinusoidal signal require a large storage capacity.

In addition, it is difficult to change the selection of clock signal by the selector 602 in synchrony with the output PWM signal to change the period of the output PWM signal. More specifically, as understood from FIGS. 2A and 2B which show actual timing chart and desired timing chart, respectively, at the changeover between clock signals, since the timing of the changeover between the clock signals is slightly delayed in FIG. 2A, the waveform of the PWM signal varies depending on the delay of the changeover. The frequency of the sinusoidal signal specified by the PWM signal varies accordingly, which is undesirable.

Moreover, if the frequency of the sinusoidal signal is to be changed, the end of the period must be monitored by detecting the overflow signal using a software of interrupt operation by the microprocessor, for example, which consumes a large time length.

Figure 3A:
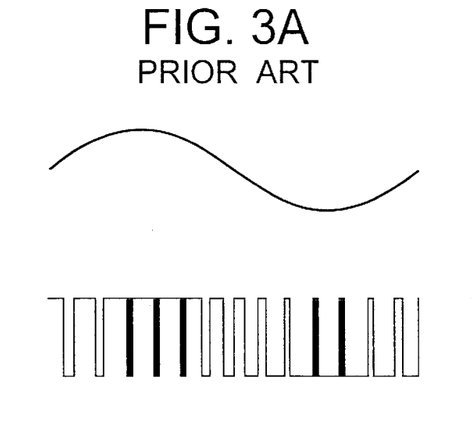
FIGS. 3A and 3B are waveform diagrams for showing higher and lower frequency, respectively, of the sinusoidal signals generated from respective PWM pulses supplied as outputs of the timer assembly of FIG. 1.
Figure 3B:
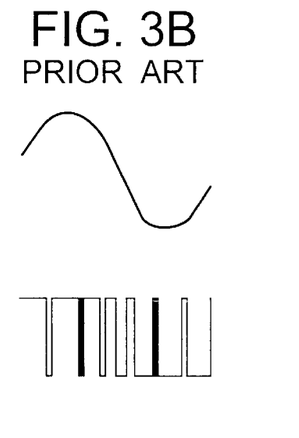

FIGS. 3A and 3B depict respective combinations of waveforms of a PWM signal and a resultant sinusoidal signal having a lower frequency and a higher frequency, respectively. As understood from FIGS. 3A and 3B, since the clock signal 603 is fixed in the conventional timer assembly, the frequency of the PWM signal is fixed, which causes that the number of pulses in one period of the sinusoidal signal differs between different frequencies for the sinusoidal signal. This results in that an accurate sinusoidal waveform cannot be obtained from the PWM pulses in case of a higher frequency of the sinusoidal signal.

In short, the conventional timer assembly cannot provide a large variety of PWM signals for generating a large number of sinusoidal waveforms without involving a larger circuit scale of the time assembly, and cannot provide an accurate waveforms for a sinusoidal signal having a higher frequency.

SUMMARY OF THE INVENTION

It is therefore an object of the present invention to provide a timer assembly which is capable of providing a large variety of PWM signals for generating a larger number of sinusoidal waveforms without involving a larger circuit scale of the time assembly, and providing an accurate waveform even in case of a higher frequency of the PWM signal.

The present invention provides a timer assembly including: a PWM signal generator including a selector for selecting one of a plurality of clock sources based on a control signal, a timer for counting clock pulses in a selected one of the clock sources to deliver a count signal representing a count in the timer and an overflow signal when the count in the timer exceeds a setting, a signal processor for generating a PWM signal based at least on the overflow signal; a count controller for responding to the overflow signal to deliver the control signal when a number of successive overflow signals exceeds a specified number.

In accordance with the timer assembly of the present invention, since the count controller delivers a control signal each time a specified number of overflow signals are generated, the clock signal can be changed at the desired timing of the PWM signal which may correspond to the end of a single period of the sinusoidal signal to be generated from the PWM signal. This affords a configuration wherein the clock signal can be changed in synchrony with the PWM signal, whereby an accurate waveform can be obtained for a higher-frequency sinusoidal signal.

The above and other objects, features and advantages of the present invention will be more apparent from the following description, referring to the accompanying drawings.

PREFERRED EMBODIMENTS OF THE INVENTION

Figure 4:
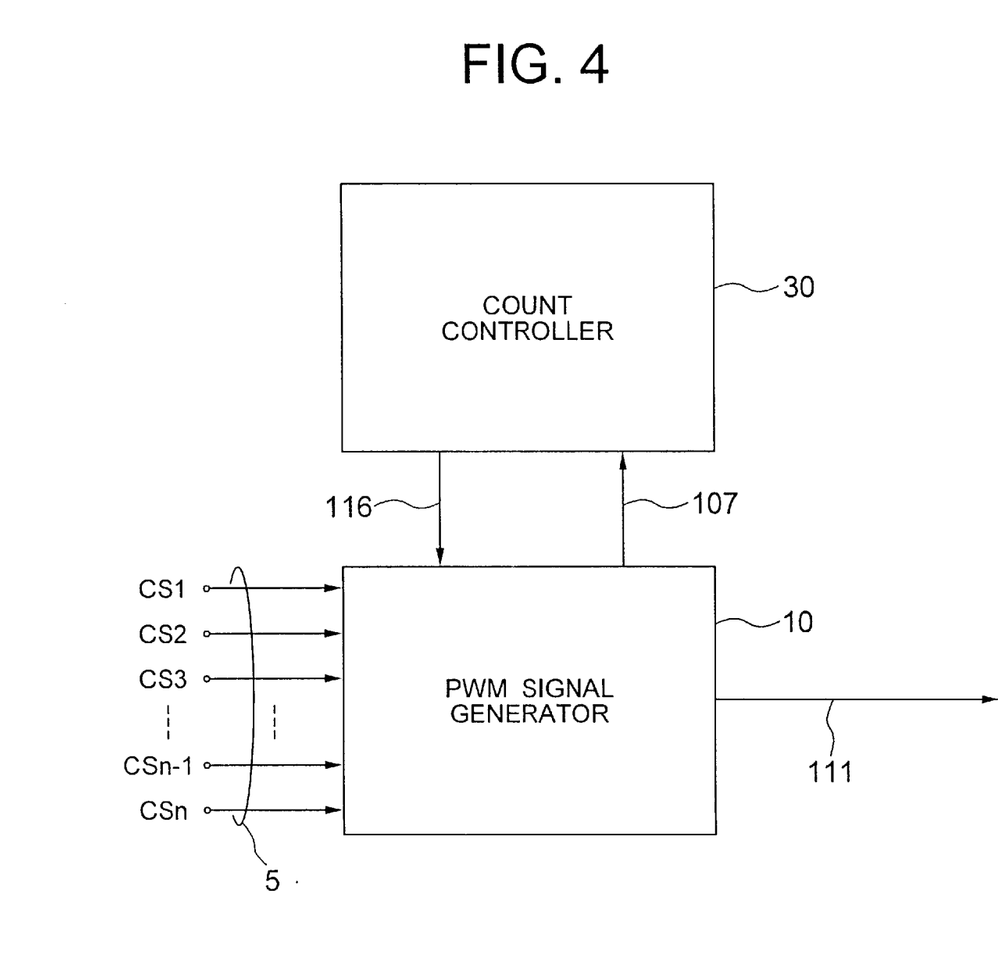
FIG. 4 is a functional block diagram of a timer assembly according to an embodiment of the present invention.

Referring to FIG. 4, a timer assembly according to an embodiment of the present invention includes a signal processor 10 and an associated count controller 30. The count controller 30 supplies a control signal 116 to the signal processor 10. The signal processor 10 responds to the control signal 116 supplied from the count controller 30 to select one of clock sources CS1 to CSn supplied thereto from outside. The signal processor 10 then counts up based on the selected clock source (or count clock signal), and delivers based on the count thereof an overflow signal 107 to the count controller 30 and a PWM signal 111 to outside the timer assembly.

The overflow signal 107 is generated when the count exceeds a specified setting, whereby the selected clock signal determines the resolution of the timer assembly.

The count controller 30 responds to the overflow signal 107 supplied from the signal processor 10, and delivers another control signal 116 based on the count of the number of the successive overflow signals 107 thus generated, thereby allowing the signal processor 10 to select another of the clock sources CS1 to Csn.

Figure 5:
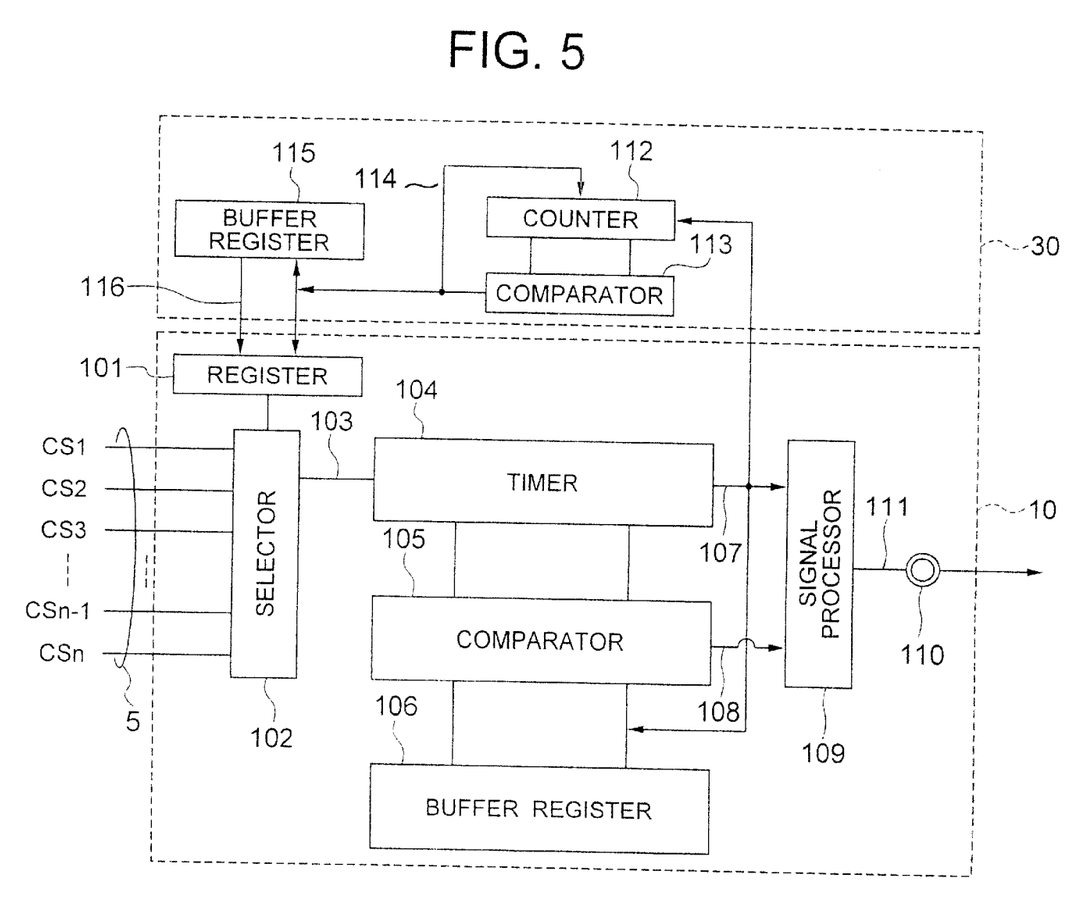
FIG. 5 is a detailed functional block diagram of the timer assembly of FIG. 4.

FIG. 5 shows details of each constituent element of the timer assembly of FIG. 4. The signal processor 10 includes a clock register 101, a clock selector 102, a timer 104, a first comparator 105, a first buffer register 106 and a signal processor 109. The clock register 101 responds to a control signal 116 to store a setting for a clock signal to be selected by the clock selector 102.

The clock selector 102 selects one of clock signals CS1 to CSn based on the setting of the clock register 101, thereby providing selected clock signal 103 to the timer 104. The timer 104 counts up based on the selected clock signal 103. The timer 104 delivers based on the count thereof a count signal to the first comparator 105 and an overflow signal 107 to the signal processor 109 and to the first buffer register 106.

The first comparator 105 has therein an internal register for storing a duty setting, which is supplied from the first buffer register 106 and determines the current duty of the PWM signal. The first comparator 105 compares the count by the timer 104 against the setting stored in the internal register, to generate a coincidence signal 108 upon coincidence of the count by the timer 104 with the duty setting.

The coincidence signal 108 is supplied to the signal processor 109. The setting of the first buffer register 106 which determines the next duty of the PWM signal is updated at a desired timing by using an external signal processor such as a microcomputer. The first buffer register 106 delivers the setting of the next duty upon generation of the overflow signal 107. The buffer register may be implemented by a ROM for storing duty data for the PWM signal.

The PWM signal supplied through the output terminal 111 to an external circuit is used for generating a desired sinusoidal signal.

The count controller 30 includes an overflow counter 112, a second comparator 113 and a second buffer register 115. The overflow counter 112 responds to the overflow signal 107 supplied from the timer 107, to count the number of successive overflow signals. The overflow counter 112 is reset by a clock change signal (instruction for selecting another clock signal) 114 supplied from the second comparator 113, which compares the count by the overflow counter 112 against a specified value stored in the second comparator 113 and delivers the clock change signal 114 upon detecting coincidence therebetween. The specified value for the second comparator 113 is equal to the number of PWM pulses forming a single period of the desired sinusoidal signal.

The second buffer register 115 responds to the clock change signal 114 to deliver a control signal 116 to the clock register 101 for specifying a clock signal among the clock sources CS1 to CSn.

The setting for the clock signal provides the sequential number of one of the clock sources CS1 to CSn to be selected as the count clock signal 103 by the clock selector 102. The selected clock source CSm ($1 \leq m \leq n$) corresponds to the frequency of the desired sinusoidal signal generated from the output PWM signal.

Figure 6:
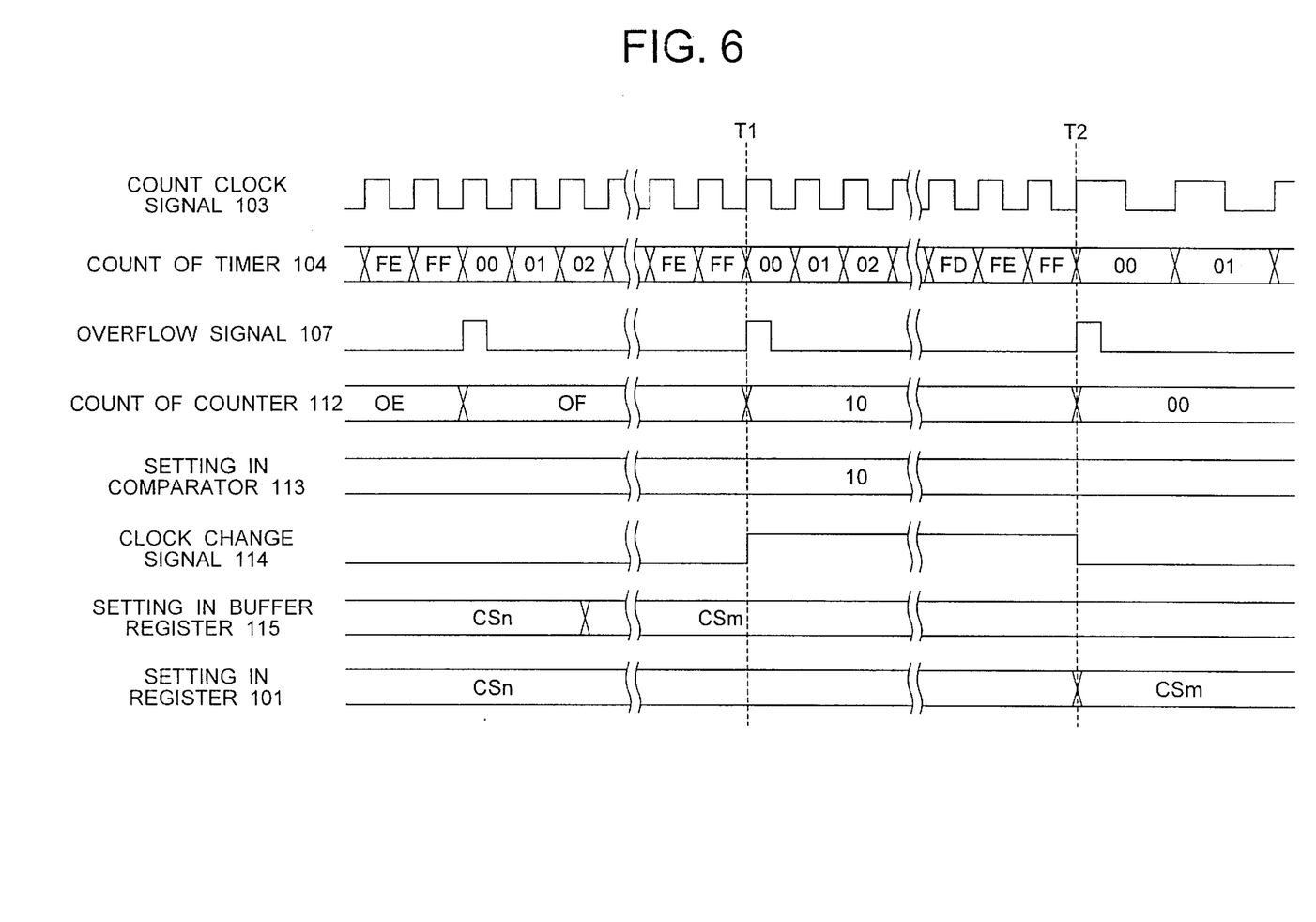
FIG. 6 is a timing chart of the timer assembly of FIG. 4.

Referring to FIG. 6, in operation of the timer assembly of FIG. 5, the timer 104 counts clock pulses of the count clock signal 103, selected from the clock sources CS1 to CSn by the clock selector 102. The timer 104 responds to the rising edges of the clock pulses of the count clock signal 103 in this example. The timer 104 delivers an overflow signal 107 upon overflow of the count by the timer 104, i.e., upon the count by the timer 104 exceeding a maximum count "FF" of the timer 104. The timer 104 then iteratively counts up from "00" to "FF" based on the count clock signal 103.

The first comparator 105 delivers a coincidence signal 108 at the timing when the count in the timer 104 falls from "FF" to "00", whereby the first comparator 105 generates a coincidence signal when the count in the timer 104 exceeds the duty setting supplied from the first buffer register 106.

The first buffer register 106 responds to the overflow signal 107 to deliver the setting for the next duty to the first comparator 105, thereby updating the setting of the internal register of the first comparator 105.

The signal processor 109 responds to the overflow signal 107 and the coincidence signal 108, to generate waveform of the PWM signal 111. The duty of the PWM signal 111 corresponds to the instantaneous amplitude of the sinusoidal signal.

The overflow counter 112 also responds to the rising edge of the overflow signal 107 for count-up thereof, wherein the count in the overflow counter 112 is incremented at the rising edge of the overflow signal 107.

The second comparator 113 delivers a clock change signal 114 at time instant T1 when the count by the overflow counter 112 coincides with the setting in the second comparator 113, which is exemplarily shown as a number of $(10)_{16}$ in FIG. 6, wherein $(10)_{16}$ means ten counted in hexadecimal notation. The clock change signal 114 then falls at time instant T2 when the count by the counter 114 is incremented by the next overflow signal 107.

The second buffer register 115 responds to the falling edge of the clock change signal 114, to deliver a control signal 116 for specifying the next clock signal CSm to the clock register 101.

The overflow counter 112 responds to the falling edge of the clock change signal 114 to reset the count of the overflow signals 107, and starts for next count-up by counting the number of overflow signals 107 from a zero count.

The clock register 101 responds to the control signal 116 to change the setting for selecting the clock source CSm at time instant T2. Thus, one of the clock sources CS1 to CSn is selected as the selected clock signal 103 in synchrony with the falling edge of the clock change signal 114 at T2.

The setting for selecting one of the clock sources CS1 to CSn is changed by an external device, such as a microcomputer, at a suitable timing before storing in the second buffer register.

In a modification of the above embodiment, the setting of the second buffer register 115 may be delivered to the clock register 101 at the rising edge of the clock change signal 114. In this case, the clock change signal 114 rises at time instant T2 at which the count of the overflow counter 112 changes from $(10)_{16}$ to $(00)_{16}$, and the overflow counter 112 is reset in synchrony with the rise of the clock change signal 114, for updating the setting of the second buffer register.

In order for generating a waveform of a sinusoidal signal having a desired frequency by using the PWM signal 111 output from the timer assembly of the present embodiment, the PWM signal should have a number of pulses and a period corresponding to the waveform of the sinusoidal signal for a single period thereof.

By specifying, as the setting in the second comparator 113, a number of PWM pulses corresponding to the waveform of the sinusoidal signal in a single period thereof, the clock change signal 114 is generated upon completion of generation of a number of PWM pulses corresponding to the single period of the sinusoidal signal.

Thus, the clock change signal 114 is delivered for each period of the sinusoidal signal, to select the previous clock source or another clock source. By changing the setting for the count clock signal 103 at a desired timing, the period of the PWM signal as well as the selected clock signal 103 can be changed at the desired timing.

Figure 7A:
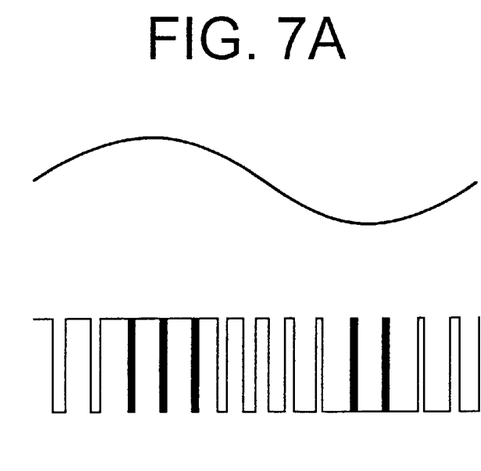
FIGS. 7A and 7B are waveform diagrams for showing lower and higher frequencies, respectively, of the sinusoidal signals generated from respective PWM pulses supplied as outputs of the timer assembly of FIG. 6.
Figure 7B:
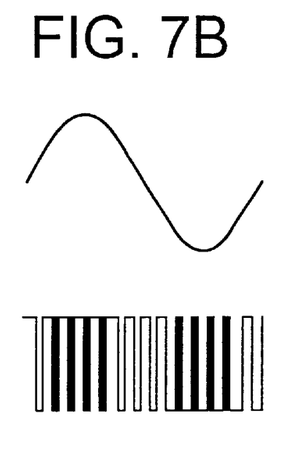

In addition, by providing the data corresponding to the number of desired PWM pulses to the first comparator 105 through the first buffer register 106, sinusoidal signals such as shown in FIGS. 7A and 7B can be obtained from the output PWM pulses shown in association therewith and corresponding to the selected clock signal 103.

The PWM signal 111 output from the timer assembly according to the embodiment has a continuous waveform corresponding to the count clock signal 103 selected by the clock selector 102. This means that the timer assembly of the present embodiment can deliver a real-time PWM signal while changing the selected clock signal for counting.

The PWM pulses in the PWM signal output from the timer assembly provide a high-frequency sinusoidal signal having an accurate waveform substantially without distortion such as shown in FIG. 3B.

The first buffer register 106 has a ROM for storing a data table used for specifying the duty of each PWM pulse based on the instantaneous amplitude of a single sinusoidal signal for a single period of the sinusoidal signal. The data table tabulates data of duty (or pulse width) of PWM signal in association with instantaneous amplitude for the single period of the sinusoidal signal. In this respect, the conventional timer assembly must have data tables in number corresponding to the number of waveforms of the desired sinusoidal signals in a ROM if the duty is to be retrieved from the ROM. In this embodiment, it is sufficient that the timer assembly of the present embodiment have a data table for a single waveform so long as the number of clock sources Cs1 to CSn corresponding to the different frequencies of sinusoidal signals are supplied thereto.

Figure 8:
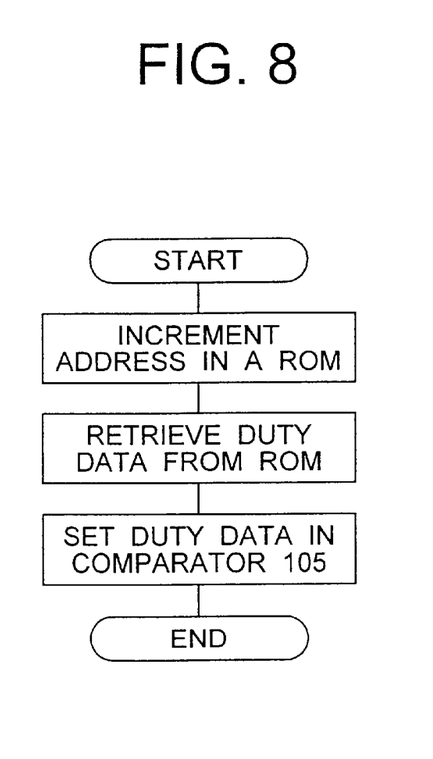
FIG. 8 is a flowchart of the timer assembly of FIG. 1.

FIG. 8 shows a flowchart of the timer assembly of the present embodiment. In the present embodiment, the process includes the steps of incrementing an address for specifying a memory cell in the ROM of the first buffer register 106, retrieving data for duty of the PWM pulse from the ROM, and storing the retrieved data in the first comparator 105. In the conventional timer assembly, additional steps of detecting an end of a single period of the PWM signal and calculating parameters for the address of the duty signal are conducted before calculating the address of the duty signal. In the present embodiment, the step of detecting the end of a single period of the PWM signal is unnecessary due to the hardware structure of the count controller 30. In addition, the address of the ROM can be obtained by increment of the previous address based on the overflow signal 107, because the duties of the PWM signal corresponding to the instantaneous amplitude of the sinusoidal signal are stored in the ROM. This is because the amount of data to be stored in the ROM is small.

Since the above embodiments are described only for examples, the present invention is not limited to the above embodiments and various modifications or alterations can be easily made therefrom by those skilled in the art without departing from the scope of the present invention.

What is claimed is:

1. A timer assembly comprising: a PWM signal generator including a selector for selecting one of a plurality of clock sources based on a control signal, a timer for counting clock pulses in a selected one of said clock sources to deliver a count signal representing a count in said timer and an overflow signal when the count in said timer exceeds a setting, a signal processor for generating a PWM signal based at least on said overflow signal; a count controller for responding to said overflow signal to deliver said control signal when a number of successive said overflow signals exceeds a specified number.

2. The timer assembly as defined in claim 1, wherein said PWM signal generator further comprises a buffer register for storing duty data representing duties of PWM pulses in said PWM signal, and a comparator for comparing the count in said timer against said duty data to deliver a coincidence signal upon coincidence of the count in said timer with said duty data, said signal processor generates said PWM signal based additionally on said coincidence signal to determine duty of said PWM signal.

3. The timer assembly as defined in claim 2, wherein duty of PWM pulse in said PWM signal corresponds to a time length between a time instant of a zero count in said timer and a time instant of generation of coincidence signal.

4. The timer assembly as defined in claim 1, wherein said count controller comprises a counter for counting a number of successive overflow signals, a comparator for comparing a count in said count controller against a setting in said counter to deliver a clock change signal, and a register for responding to said clock change signal to deliver said control signal.

5. The timer assembly as defined in claim 1, wherein said setting in said timer is equal to a number of PWM pulses in said PWM signal corresponding to a single period of a sinusoidal signal generated from said PWM signal.

6. The timer assembly as defined in claim 1, wherein said selected one of said clock sources determines a resolution for said timer.

7. The timer assembly as defined in claim 1, wherein a period of said PWM signal corresponds to a time length between a time instant of a zero count in said timer and a time instant of generation of said overflow signal.

8. The timer assembly as defined in claim 1, wherein selection of said one of said clock sources is in synchrony with said PWM signal.

9. The timer assembly as defined in claim 1, wherein said count controller includes an overflow counter for counting said number of successive said overflow signals, a comparator for comparing a count in said overflow counter against said specified number to deliver a coincidence signal, and a buffer register for changing said control signal responding to said coincidence signal.

* * * * *